United States Patent [19]

Yu et al.

[11] Patent Number: 6,165,670
[45] Date of Patent: Dec. 26, 2000

[54] METHOD OF TREATING ELECTROSTATOGRAPHIC IMAGING WEB AND METHOD OF MAKING ELECTROSTATOGRAPHIC IMAGING MEMBERS USING SUCH IMAGING WEB

[75] Inventors: Robert C. U. Yu; John J. Darcy, both of Webster; Edouard E. Langlois, Irondequoit, all of N.Y.

[73] Assignee: Xerox Corporation, Stamford, Conn.

[21] Appl. No.: 09/317,444

[22] Filed: May 24, 1999

[51] Int. Cl.[7] .................. G03G 5/05; B05D 3/02; D01D 5/24; B29C 71/00
[52] U.S. Cl. ................. 430/130; 427/374.1; 264/171.25; 264/237
[58] Field of Search .................. 430/130; 427/374.1; 264/171.25, 237

[56] References Cited

U.S. PATENT DOCUMENTS

| | | | |
|---|---|---|---|
| 3,121,006 | 2/1964 | Middleton et al. | 430/31 |
| 3,442,781 | 5/1969 | Weinberger | 430/32 |
| 3,972,717 | 8/1976 | Wiedemann | 430/65 |
| 4,233,384 | 11/1980 | Turner et al. | 430/72 |
| 4,265,990 | 5/1981 | Stolka et al. | 430/96 |
| 4,286,033 | 8/1981 | Neyhart et al. | 430/60 |
| 4,291,110 | 9/1981 | Lee | 430/60 |
| 4,299,897 | 11/1981 | Stolka et al. | 430/73 |
| 4,302,521 | 11/1981 | Takei et al. | 430/81 |
| 4,306,008 | 12/1981 | Pai et al. | 430/85 |
| 4,338,387 | 7/1982 | Hewitt | 430/85 |
| 4,415,639 | 11/1983 | Horgan | 430/64 |
| 4,439,507 | 3/1984 | Pan et al. | 430/66 |
| 4,472,467 | 9/1984 | Tamaki et al. | 427/374.1 |
| 4,532,166 | 7/1985 | Thomsen et al. | 428/57 |
| 4,786,570 | 11/1988 | Yu et al. | 430/64 |
| 4,801,517 | 1/1989 | Frechet et al. | 430/73 |
| 4,806,443 | 2/1989 | Yanus et al. | 430/66 |
| 4,806,444 | 2/1989 | Yanus et al. | 430/66 |
| 4,937,117 | 6/1990 | Yu | 428/57 |
| 4,994,214 | 2/1991 | Stevens et al. | 264/237 |
| 5,021,109 | 6/1991 | Petropoulos et al. | 156/137 |
| 5,021,309 | 6/1991 | Yu | 430/56 |
| 5,030,532 | 7/1991 | Limburg et al. | 430/73 |
| 5,240,532 | 8/1993 | Yu | 156/137 |
| 5,262,512 | 11/1993 | Yanus et al. | 528/181 |
| 5,527,652 | 6/1996 | Krumberg et al. | 430/130 |
| 5,606,396 | 2/1997 | Yu et al. | 399/162 |
| 5,911,934 | 6/1999 | Yu et al. | 264/237 |

FOREIGN PATENT DOCUMENTS

| | | | |
|---|---|---|---|
| 5-346670 | 12/1993 | Japan | 430/130 |
| 1173376 | 8/1985 | Russian Federation | 430/130 |

*Primary Examiner*—Roland Martin
*Attorney, Agent, or Firm*—Oliff & Berridge, PLC; Eugene O. Palazzo

[57] ABSTRACT

A method of treating an electrostatographic imaging member web is applied to a web that includes a support substrate and at least one imaging layer formed over the support substrate. The electrostatographic imaging member web can optionally include no anti-curl backing layer. The web is bent into an arcuate shape and heated to a temperature above the glass transition temperature of the imaging layer. The imaging layer is then cooled while in the arcuate shape to a temperature below the glass transition temperature, forming a substantially stress-free imaging layer when conforming to the arcuate shape. The electrostatographic imaging members can be electrographic and electrophotographic imaging members. The treated electrostatographic imaging member webs can be formed into seamed electrostatographic imaging member belts such as ionographic imaging member belts and photoreceptor belts.

29 Claims, 5 Drawing Sheets

METHOD OF TREATING ELECTROSTATOGRAPHIC IMAGING WEB AND METHOD OF MAKING ELECTROSTATOGRAPHIC IMAGING MEMBERS USING SUCH IMAGING WEB

BACKGROUND OF THE INVENTION

1. Field of Invention

This invention relates to a method of treating a flexible electrostatographic imaging web. This invention further relates to a method of making electrostatographic imaging members from such electrostatographic imaging webs.

2. Description of Related Art

Flexible electrostatographic imaging members include, for example, electrophotographic imaging members or photoreceptors for electrophotographic imaging systems and electroreceptors or ionographic imaging members for electrographic imaging systems. These electrostatographic imaging members are formed into belts and are typically formed by cutting sheets from a roll of flexible electrostatographic imaging web, overlapping opposite ends of the cut sheets, and joining the overlapped ends together to form a seam.

Flexible electrophotographic imaging members or photoreceptors typically comprise a substrate and a plurality of layers formed on the substrate. The multiple layers typically include an electrically conductive layer, an optional hole blocking layer, an adhesive layer, a charge generating layer and a charge transport layer formed in this order on the substrate, and also an anti-curl backing layer.

SUMMARY OF THE INVENTION

Excellent toner images have been obtained with flexible electrostatographic imaging members including electrophotographic imaging members or photoreceptors in the form of continuous, flexible belts. However, it has been found that as more advanced, higher speed electrophotographic imagers including copiers, duplicators and printers have been developed with utilization of photoreceptors in flexible belt form, pre-mature cracking of the charge transport layer and/or cracking/delamination at the welded seam frequently occurs during electrophotographic imaging/cleaning belt cycling processes, in particular, when less durable materials are used. Cracks developed in the photoreceptor transport layer cause print defects in the final copy and therefore shorten the belt's targeted service life. Cracking/delamination at the seam creates deposition sites at which debris such as toners, carrier beads, paper fibers, and dirt particles can accumulate. Such debris accumulation at the seam cracking/delamination sites, when reaching a saturation point, has been observed to spread out over the photoreceptor surface by the cleaning blade action during dynamic belt function and manifests into black spot print-outs in final copies. Moreover, sites of seam cracking/delamination can, upon striking by the sliding cleaning blade mechanical action, eventually form flaps that then cut the blade tip and cause premature loss of the blade's cleaning efficiency due to toner leakage through the cuts during photoreceptor belt imaging/cleaning machine cycling.

There is also a need for long service life, flexible belt photoreceptors in compact imaging machines that include belt modules employing small diameter support rollers for photoreceptor belt systems operating in a very small spaces. Small diameter support rollers are particularly desirable for simple, reliable copy paper self stripping systems which utilize the beam strength of the copy paper to automatically remove copy paper sheets from the surface of photoreceptor belts after completion of toner image transfer. Unfortunately, small diameter rollers, such as those rollers having a diameter of less than about 0.75 inch, raise the threshold of mechanical performance criteria to such a high level that the occurrence of photoreceptor belt charge transport layer and/or seam cracking due to cyclic fatigue bending stresses in the belt can become a serious problem for multi-layered photoreceptor belt applications.

Flexible photoreceptors include a support substrate and a plurality of layers formed on opposite sides of the support substrate. Typically, a charge transport layer, charge generation layer, adhesive layer and charge blocking layer are formed on one side of the support substrate, and an anti-curl backing layer is formed on the opposite side of the support substrate. The flexible photoreceptors are typically provided in the form of sheets or webs, which are then used to manufacture into seamed electrophotographic imaging member belts or photoreceptor belts. The flexible photoreceptor webs are typically square or rectangular in shape. The flexible photoreceptor belts include seams which are typically prepared by overlapping the opposite ends of the web by a distance of between about 0.5 mm and about 1.5 mm, and welding the overlapped ends together by a conventional technique such as ultrasonic welding. In this welding technique, an ultrasonic welding horn is passed over and along the overlapped joint of the photoreceptor sheet. The ultrasonic welding operation forms a seam "splash" adjacent to either side of the overlapping joint of the seam. For a typical photoreceptor device, the splash consists of a molten mixture of the materials comprising the charge transport layer, charge generation layer, adhesive layer, charge blocking layer and anti-curl backing layer, at the overlapped joint.

Under dynamic fatigue loading conditions existing in electrophotographic imagers, the junction where the splash edge meets the charge transport layer surface provides a focal point for stress concentration and becomes a point of mechanical integrity failure in the photoreceptor belt. Dynamic fatigue at this stress concentration point facilitates tear initiation through the charge transport layer to form a vertical crack. This crack then propagates horizontally through the weak charge generating layer/adhesive layer interface bond to produce local seam delamination.

In addition, seams fabricated using ultrasonic welding methods have an excessive seam overlap thickness and large splashes, which interfere with cleaning blade operations, exacerbate cleaning blade wear, affect photoreceptor belt motion quality and disturb toner image acoustic transfer assist device operations. Such known photoreceptor belts are also prone to develop charge transport layer cracking and belt ripples when fatigue cycled in an electrophotographic imager.

Another problem, that occurs in known photoreceptor belts used in liquid development systems, is that induced bending stress (as the photoreceptor belt bends and flexes over the belt module support rollers) coupled with exposure contact with the liquid developers accelerates cracking of the charge transport layer and/or the welded seam. Premature onset of photoreceptor belt fatigue charge transport layer cracking and/or seam cracking/delamination requires frequent, costly belt replacement and seriously impacts the versatility of a photoreceptor belt, which thereby reduces the belt's practical value for use in automatic electrophotographic imagers.

In flexible photoreceptor web production processes, the polymeric coating layers formed over the support substrate are applied by a solution coating process. The elevated temperature drying and subsequent cooling processes for the applied coating layers are noted to cause the resulting photoreceptor web to exhibit a substantial amount of upward photoreceptor webstock curling, due to the coefficient of thermal expansion/contraction mismatch between the materials forming the support substrate and the applied coating layers, and the charge transport layer in particular. For typical known photoreceptors, the thermal expansion/contraction of the applied coating layers is typically about 3.8 times greater than that of the supporting substrate. Consequently, the photoreceptor web curling is always upwards toward the direction of the applied coating layers. In attempts to address the problem of curling, known photoreceptors normally require an anti-curl backing layer, coated to the back side of the supporting substrate, opposite to the electrically operative layers, to counteract the curl and render the desired photoreceptor flatness. Without an anti-curl backing layer, known flexible photoreceptor sheets will spontaneously curl upwardly into a small 1½ inch diameter roll caused by the contracting effect of the charge transport layer.

However, the requirement of an anti-curl backing layer to provide photoreceptor flatness does introduce problems to the fabricated photoreceptor belts. For example, known photoreceptor belts have been determined to contain a substantial amount of built-in internal tensile strain in the charge transport layer due to the counter balancing force exerted by the anti-curl backing layer coating to offset the curl. The value of built-in internal strain in the charge transport layer for typical known photoreceptor belts is approximately 0.275%. When cycled in an electrophotographic imager including an active steering roll to control belt walking, this internal tensile strain within the charge transport layer is exacerbated by photoreceptor belt shear strain, induced by the steering action of the steering roll, to cause the generation of a transverse compression force from both photoreceptor edges and directed toward the middle of the belt to promote the development of belt ripples during fatigue cycling photoreceptor belt machine function. The belt ripples have the appearance of a series of fine rings extending around the circumference of a photoreceptor belt. Because the wave-like topology of these ripples in the photoreceptor belt prevents uniform contact between receiving sheets, that is papers, and toner images carried on the surface of the photoreceptor belt for complete toner image transfer, belt ripples thereby adversely affect the quality of the final copy print-outs. Moreover, belt ripples also prevent the cleaning blade from making intimate contact with the photoreceptor surface, thus ripples can significantly reduce the efficiency of cleaning blade function, which in turn is detrimental to the formation of high quality images in the final print copies.

Photoreceptors having an anti-curl backing layer to provide their flatness also have been found to reduce the resistance of the onset of cyclic fatigue charge transport layer cracking during cycling over belt support rollers, because the induced photoreceptor bending strain is compounded by the inherent internal strain that is already built-in in the charge transport layer. Fatigue bending strain over belt support rollers during dynamic photoreceptor belt machine cycling, causes cracking development in the charge transport layer as well as seam cracking/delamination, which shortens the service life of the photoreceptor belt. Moreover, the presence of an anti-curl backing layer in the photoreceptor material package also increases the volume of molten mass ejection during the ultrasonic seam welding process of the overlap joint to produce a larger splash.

The application of an anti-curl backing layer during photoreceptor manufacturing is also an additional coating operation, which increases the costs and complexity of the manufacturing process and decreases the daily photoreceptor production throughput by about 30%. The application of an anti-curl backing layer involves additional handling of the photoreceptor web, which also increases the likelihood of creating more coating defects, as well as introducing other physical and cosmetic defects such as scratches, creases, wrinkles and the like. Therefore, the application of an anti-curl backing layer has also added another adverse cost impact because the process can cause a substantial reduction in photoreceptor production yield.

Although the foregoing description refers in detail to electrophotographic imaging members or photoreceptors, the problems described are also applicable to electrographic imaging members. Electrographic imaging members include a substrate, and typically also an electrically conductive layer and an insulative imaging layer formed over the substrate.

This invention provides improved flexible electrostatographic imaging member webs.

This invention separately provides improved flexible electrophotographic imaging member webs or flexible photoreceptor webs.

This invention separately provides flexible electrostatographic imaging member webs that can be fabricated into flexible electrostatographic imaging member belts or flexible photoreceptor belts.

This invention separately provides flexible photoreceptor belts or electroreceptor belts that do not include an anti-curl backing layer.

This invention separately provides flexible photoreceptor belts including a charge transport layer which has improved resistance to fatigue cracking during extensive imaging cycling.

This invention separately provides flexible electroreceptor belts including a charge transport layer which has improved resistance to fatigue cracking during extensive imaging cycling.

This invention separately provides improved flexible photoreceptor belts or electroreceptor belts having reduced seam thickness and reduced seam splash.

This invention separately provides improved flexible photoreceptor belts or electroreceptor belts including a welded seam having improved resistance to cracking/delamination failure during extensive image belt cycling.

This invention separately provides improved flexible photoreceptor belts or electroreceptor belts having increased resistance to ripple formation during electrostatographic imager operation.

This invention separately provides improved flexible photoreceptor belts having increased resistance to charge transport layer cracking and increased cycling life when used in electrophotographic imagers that utilize a liquid development imaging process.

This invention separately provides improved flexible electroreceptor belts having increased resistance to imaging layer cracking and increased cycling life when used in electrographic imagers that utilize a liquid development imaging process.

This invention separately provides methods for treating the flexible electrostatographic imaging member webs that promote imaging member belt cycling life extension and effects belt manufacturing cost cutting measures. Although the methods are particularly advantageous to treat flexible electrostatographic imaging member webs that do not include an anti-curl backing layer, the methods are also applicable as well for treating flexible imaging member webs that include an anti-curl backing layer.

This invention separately provides methods for forming flexible electrostatographic imaging members from the flexible electrostatographic imaging member webs that do not include an anti-curl backing layer, as well as from flexible imaging webs that include an anti-curl backing layer.

Exemplary embodiments of an electrographic imaging member web according to this invention provide flexible electrographic imaging member webs including a support substrate and an imaging layer.

Exemplary embodiments of an electrophotographic imaging member web or photoreceptor web according to this invention provide flexible photoreceptor webs including a support substrate and at least one coating layer over the substrate.

In exemplary embodiments, the flexible photoreceptor webs do not include an anti-curl layer. The charge transport layers in the photoreceptor webs are substantially free of the transverse internal tension strain that is present in known typical photoreceptor webs that include such an anti-curl layer. The substantial elimination of transverse internal tension strain substantially eliminates the cross imaging belt tension strain, which thereby effects the removal of imaging belt edge curl and provides improved imaging belt edge flatness.

In exemplary embodiments of the processes of this invention, flexible electrostatographic imaging belts are fabricated from an electrostatographic imaging member web without an anti-curl layer, which are treated according to exemplary embodiments of the processes of this invention.

Exemplary embodiments of the processes of this invention provide flexible electrostatographic imaging member webs that comprise a flexible support substrate and at least one coating layer. The coating can comprise a film forming thermoplastic polymer. The electrostatographic imaging member webs of exemplary embodiments do not include an anti-curl backing layer. The exemplary embodiments include a processing step that is performed off-line on imaging member web stock material after forming the coating layer.

In exemplary embodiments of the processes of this invention, electrostatographic imaging member webs having no anti-curl backing layer are formed into imaging member cut sheets. For example, the webs can be cut to form sheets having selected dimensions. An anti-curl backing layer typically increases the overall thickness of photoreceptor devices by about 20%. By eliminating the need of an anti-curl backing layer from electrostatographic imaging member belts formed from the exemplary embodiments of the electrostatographic imaging member webs, the belts have a decreased overall thickness, which reduces the induced bending stress when the belts flex over belt support module rollers during imager operation. Consequently, the onset of fatigue cycling cracking of the coating layer such as the charge transport layer of the belt is delayed. Furthermore, the absence of an anti-curl backing layer at the overlapped joint decreases the ejected volume of the molten mass that forms seam splashes during the seam welding process.

Exemplary embodiments of the processes of this invention comprise stepwise treating of flexible electrostatographic imaging member webs, for example the photoreceptor web, to achieve charge transport layer stress release, and also to eliminate the need for an anti-curl backing layer. Exemplary embodiments of the processes comprise bending the photoreceptor web, with the charge transport layer facing outwardly, into an arc having an imaginary axis which traverses the width of the web.

In seamed photoreceptor belts prepared from photoreceptor webs having no anti-curl backing layer according to embodiments of this invention, the thickness of the welded seam is substantially reduced and the size of the seam splash that is produced during seam formation is reduced by at least about 40% as compared to seamed photoreceptor belts having such an anti-curl backing layer. The reduced seam thickness and smaller splash reduces the mechanical interaction against cleaning blades, acoustic transfer assist devices, and other interacting subsystems, as well as suppresses seam cracking/delamination failure problems when the imaging member belt flexes over small diameter support rollers during electrophotographic imaging and cleaning processes. Furthermore, a thinner photoreceptor belt configuration coupled with charge transport layer stress release by embodiments of the processes of this invention extends photoreceptor belt fatigue cycling life over small diameter belt support rollers, without encountering premature fatigue charge transport layer cracking or liquid developer exposure induced charge transport layer cracking of the belts.

BRIEF DESCRIPTION OF THE DRAWINGS

The preferred embodiments of this invention will be described in detail, with reference to the following figures, in which.

DETAILED DESCRIPTION OF PREFERRED EMBODIMENTS

Figure 1:
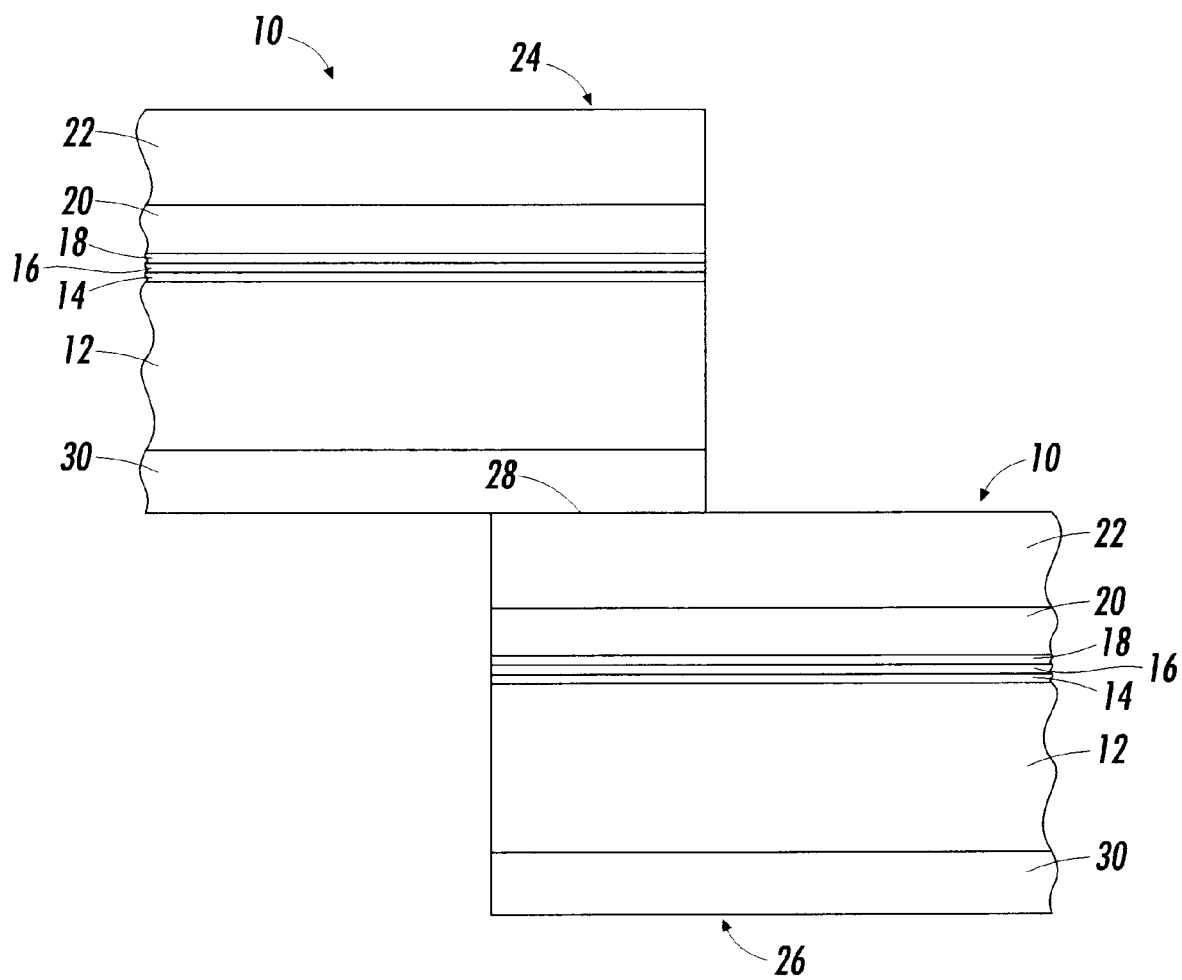
FIG. 1 is a side view of a known typical flexible, multiple layered electrophotographic imaging member or photoreceptor including an anti-curl layer, showing the opposite ends of a cut sheet photoreceptor in an overlapped arrangement.

FIG. 1 shows a known flexible electrophotographic imaging member sheet or photoreceptor 10 that has its opposite ends physically overlapped prior to application of an ultrasonic seam welding operation. The photoreceptor 10 is in the form of a web. The photoreceptor 10 includes a substrate 12 and a plurality of layers 14–22 formed over the substrate 12. The photoreceptor 10 includes a first end edge portion 24 which overlaps a second end edge portion 26 to form an overlap region 28. The photoreceptor 10 is shown prior to joining together the first end edge portion 24 and the second end edge portion 26 to form a seam and produce a continuous electrophotographic imaging member belt or seamed photoreceptor belt as described in detail below.

The layers 14–22 of the photoreceptor 10 comprise materials having suitable compositions and mechanical properties. These layers include an electrically conductive layer 14, a charge blocking layer 16, an adhesive layer 18, a charge generating layer 20 and a charge transport layer 22, formed in this order over the support substrate 12. To render the desirable flatness, the photoreceptor 10 further includes an anti-curl backing layer 30 formed on the side of the substrate 12 that is opposite to the layers 14–22. Exemplary layers are described, for example, in U.S. Pat. Nos. 4,786,570; 4,937,117 and 5,021,309, each incorporated herein by reference in its entirety.

The photoreceptor 10 can optionally comprise a charge transport layer sandwiched between a conductive surface layer of a support substrate and a charge generating layer to yield an inverted photoreceptor structure.

The support substrate 12 is flexible and typically has an electrically conductive surface layer to anchor the applied overlying coating layers 14–22. For known photoreceptors, at least one photoconductive layer is applied over the electrically conductive layer. A charge blocking layer can be applied to the electrically conductive layer prior to the application of the photoconductive layer. An adhesive layer can optionally be provided between the charge blocking layer and the photoconductive layer. For multiple-layered photoreceptors, a charge generation binder layer is typically applied onto such an adhesive layer, or directly over the blocking layer, and a charge transport layer is subsequently formed on the charge generation layer. For ionographic imaging members or electroreceptors, an electrically insulating dielectric imaging layer is applied over the electrically conductive surface layer. In known photoreceptor belts, an optional anti-curl back coating such as the anti-curl backing layer 30 can be applied on the side of the support substrate opposite to the side on which the photoconductive layer (or dielectric imaging layer of an electroreceptor) is formed, to flatten the imaging member.

Figure 2:
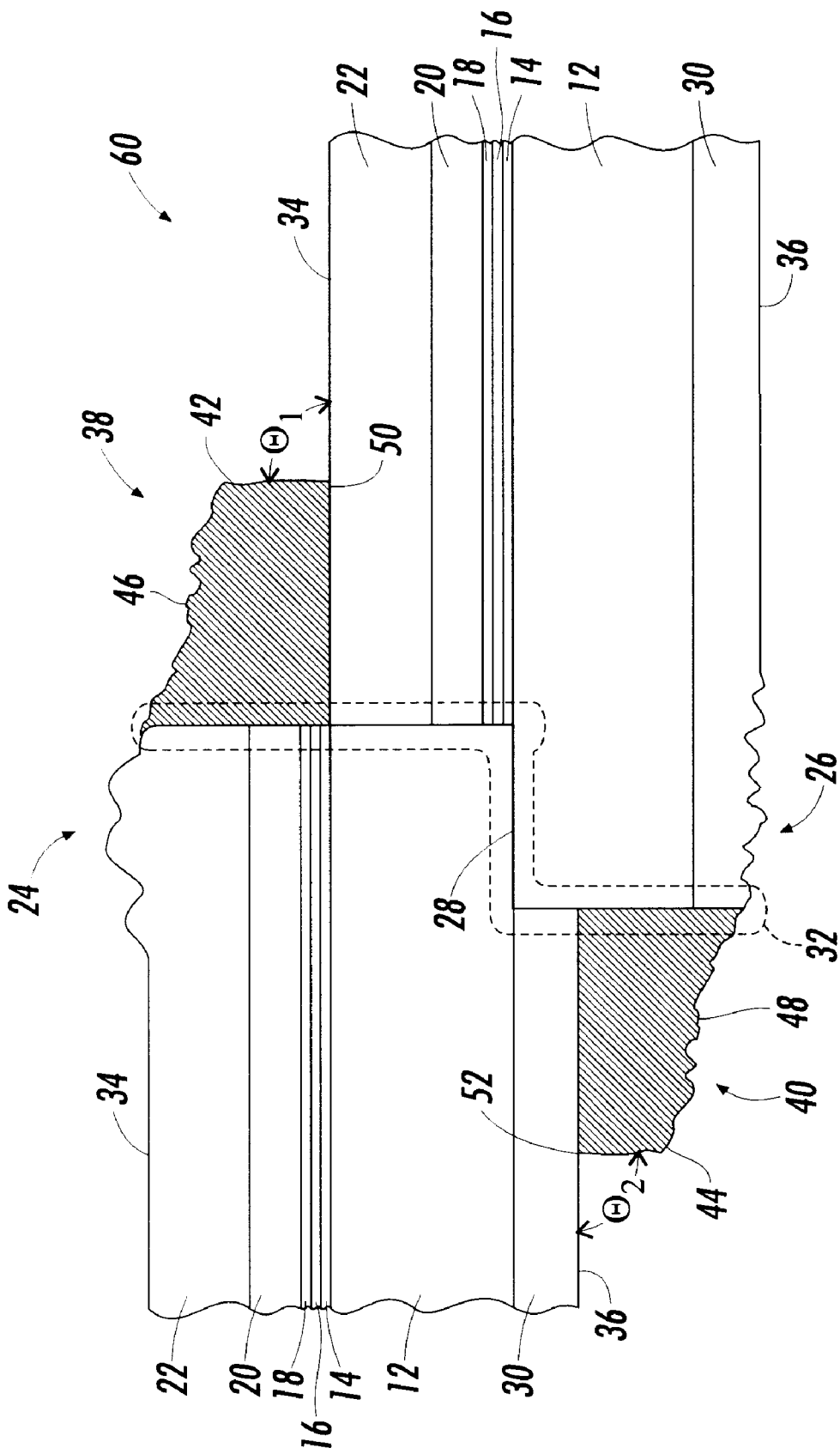
FIG. 2 is a side partial cross-sectional view of the photoreceptor overlapped joint of FIG. 1 after the overlapping ends of the sheet have been joined by an ultrasonic welding technique to form a seamed photoreceptor belt.

Referring to FIG. 2, the first end edge portion 24 and the second end edge portion 26 can be joined by any suitable joining technique to form a seam 32 (shown in dotted line). Suitable known joining techniques include, for example, ultrasonic welding, gluing, taping, stapling and pressure and heat fusing, which can be employed to form a seamed, continuous imaging member. The seamed, continuous imaging member can be in the form of a belt, sleeve or cylinder. An ultrasonic welding technique can be used to bond the first end edge portion 24 and the second end edge portion 26 into the seam 32 in the overlap region 28. In ultrasonic seam welding processes, ultrasonic energy is applied to the overlap region 28 to melt the layers of the photoreceptor 10 including the charge transport layer 22, charge generating layer 20, adhesive layer 18, charge blocking layer 16, conductive layer 14, a small portion of the substrate 12, and the anti-curl backing layer 30. The photoreceptor 10 is transformed from a web illustrated in FIG. 1 into a continuous seamed photoreceptor belt 60 by the seam welding process. The seam 32 joins the first end edge portion 24 and the second end edge portion 26 of the photoreceptor web 10 such that the first major exterior surface 34 (and typically at least one layer above the first major exterior surface 34) at and/or near the first edge portion 24 is integrally joined with the second major exterior surface 36 (and typically at least one layer below the second major exterior surface 36) at and/or near the second edge portion 26. The seam 32 includes a first splash 38 and a second splash 40, disposed at the top of second end edge portion 26 and at the bottom of first end edge portion 24, respectively. The first and second splashes 38 and 40 are formed during the joining of the first and second end edge portions 24 and 26. Molten material is ejected from the overlap region 28 to facilitate direct fusing of the two contacting surfaces between the portion of the support substrate 12 of the first end edge portion 24 and the portion of the support substrate 12 of the second end edge portion 26. This material ejection results in the formation of the first and second splashes 38 and 40. The first splash 38 is formed above the overlapping second end edge portion 26 abutting the first major exterior surface 34 and adjacent to and abutting the overlapping first end edge portion 24. The second splash 40 is formed and positioned below the overlapping first end edge portion 24 abutting the second major exterior surface 36 and adjacent to and abutting the overlapping second end edge portion 26. The splashes 38 and 40 extend beyond the sides and the ends of the seam 32 in the overlap region 28 of the photoreceptor belt 60. The extension of the splashes 38 and 40 beyond the sides and the ends of the seam 32 is undesirable for many machines, such as electrostatic copiers and duplicators, which require precise belt edge positioning of the imaging member during machine operation. Typically, the protrusions of the splashes 38, 40 that extend beyond each end of the seam 32 are removed by an operation such as notching, which cuts a slight notch into each end of the seam 32 to remove the end splashes and a tiny portion of the seam 32 itself.

A typical splash has a thickness of about 70 $\mu$m. Each of the splashes 38 and 40 has an uneven, generally rectangular shape and includes a respective free side 42 and 44 and a respective exterior facing side 46 and 48. The exterior facing sides 46 and 48 are generally parallel to the first major exterior surface 34 and the second exterior major surface 36. The flee side 42 of the first splash 38 is substantially perpendicular to the first major exterior surface 34 at the first junction 50, and the free side 44 of the second splash 40 is substantially perpendicular to the second major exterior surface 36 at the second junction 52. The first and second junctions 50 and 52 each provide a focal point for stress concentration and represent initial sites of failure that affects the mechanical integrity of the photoreceptor belt 60.

During imaging machine operation, the seamed photoreceptor belt 60 cycles or bends over belt support rollers. The belt support rollers typically have a small diameter, as in an electrophotographic imager. As a result of dynamic bending of the flexible photoreceptor belt 60 during cycling, the small diameter rollers exert a bending strain on the photoreceptor belt 60, which causes a large amount of stress to develop generally in the region of the seam 32 due to the excessive thickness at this location. The stress concentrations that are induced by bending near the first and second seam splash junctions 50 and 52 can reach values much larger than the average value of the stress over the entire belt length of the photoreceptor belt 60.

The magnitude of the induced bending stress is inversely related to the diameter of the rollers over which the photoreceptor belt 60 bends, and is directly related to the thickness of the seam 32. When the thickness of the overlap region of the photoreceptor belt 60 is enlarged, high localized stress occurs near the regions of discontinuity, e.g. the first and second junctions 50 and 52. When the photoreceptor belt 60 is bent over the belt support rollers in an electrophotographic imager, the second major exterior surface 36, which contacts the exterior surface of the roller, is under compression. In contrast, the first major exterior surface 34 is under tension.

These stresses are attributable to the second major exterior surface 36 and the first major exterior major surface 34 moving through a portion of an arcuate path about a roller that has a circular cross section. Because the first major exterior surface 34 is located at a greater radial distance from the center of the roller than the second exterior major surface 36, the first major exterior surface 34 must travel a greater distance than the second major exterior surface 36 in the same time period. Therefore, the first major exterior surface 34 is stretched under tension relative to the generally central portion of the photoreceptor belt 60 (the portion generally extending along the center of gravity of the photoreceptor belt 60). Conversely, the second major exterior surface 36 is compressed relative to the generally central portion of the photoreceptor belt 60. Consequently, the bending stress at the first junction 50 is a tensile stress, and the bending stress at the second junction 52 is a compressive stress.

Figure 3:
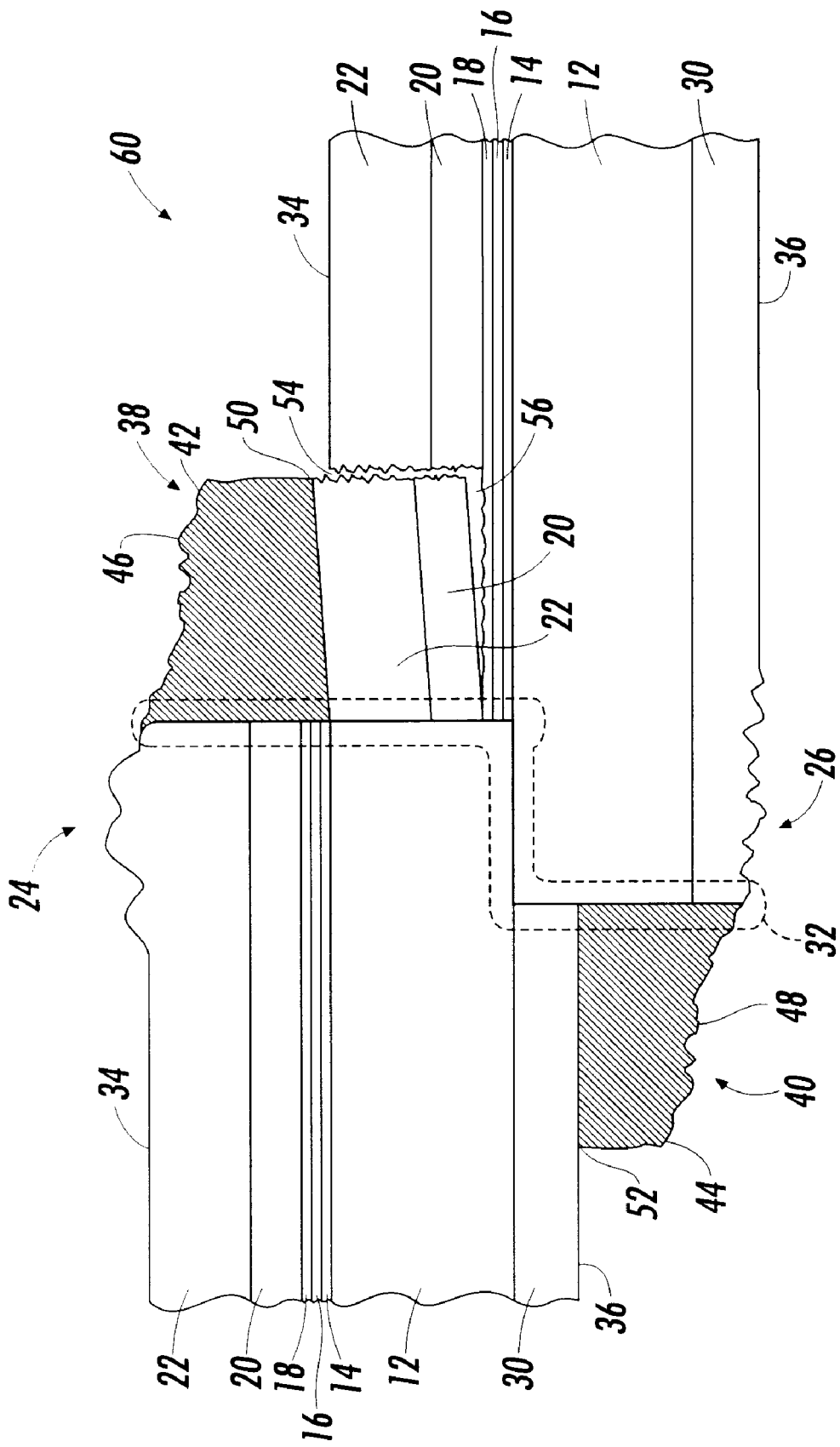
FIG. 3 is a side partial cross-sectional view of the photoreceptor belt of FIG. 2 exhibiting seam cracking and delamination after extended fatigue belt cycling function.

Compressive stresses, such as those acting at the second junction 52, rarely cause failure of the seam 32. Tensile stresses, such as those acting at the first junction 50, however, are much more likely to cause such failure. The tensile stress concentration at the first junction 50 greatly increases the likelihood of tear initiation, which produces a crack through the electrically active layers of the photoreceptor belt 10, as illustrated in FIG. 3. The tear 54 illustrated in FIG. 3 is adjacent to the second edge portion 26 of the photoreceptor 10. The tear 54 is initiated in the charge transport layer 22 of the photoreceptor and propagates through the charge generating layer 20 along a plane that extends from the surface of the free side 42 of the first splash 38. The tear 54 extends generally horizontally, leading to a seam delamination 56. The seam delamination 56 propagates along the interface between the adjoining surfaces of the relatively weakly adhesively bonded charge generating layer 20 and the adhesive layer 18. Because of its appearance, the seam delamination 56 is commonly referred to as "seam puffing". The excessive thickness of the first splash 38 and the stress concentration at the first junction 50 tend to promote the development of dynamic fatigue failure of the seam 32, and can also lead to the separation of the joined first and second edge portions 24 and 26, respectively, and severing of the photoreceptor belt 60. This failure greatly shortens the service life of the photoreceptor belt 60.

In addition to causing the above-described seam failure, the tear 54 provides a depository site at which toner particles, paper fibers, dirt, debris and various other undesirable materials can deposit during electrophotographic imaging and cleaning processes. For example, during the cleaning process, a conventional cleaning instrument, such as a cleaning blade, is repeatedly passed over the tear 54. As the tear 54 region becomes filled with such materials, the cleaning instrument dislodges at least a portion of the highly concentrated materials from the tear 54. The amount of the dislodged materials, however, often exceeds the capability of the cleaning instrument to remove such materials from the photoreceptor 10. As a consequence, the cleaning instrument dislodges the materials, but is unable to remove the entire amount of the materials during the cleaning process. Consequently, at least portions of the highly concentrated materials are deposited onto the surface of the photoreceptor 10. Thus, the cleaning instrument spreads the materials across the surface of the photoreceptor belt 60, rather than effectively removing the materials as desired.

In addition to causing seam 32 failure and spreading of undesirable materials, when the seam delamination 56 occurs, the portion of the photoreceptor belt 60 disposed above the seam delamination 56, can become a flap which can move upwardly. This upward movement of the flap presents an additional problem in the cleaning operation because it is an obstacle in the path of the cleaning instrument as the instrument travels across the surface of the photoreceptor belt 60. The cleaning instrument eventually strikes the flap when the flap extends upwardly. As the cleaning instrument strikes the flap, significant force is exerted on the cleaning instrument, which can cause cleaning blade damage or failure.

In addition to damaging the cleaning blade, such collisions between the cleaning blade and the flap causes unwanted velocity variations in the photoreceptor belt 60 during cycling. This unwanted velocity variation adversely affects the copy/print quality produced by the photoreceptor belt 60, particularly in high speed precision machines such as color copiers, in which the colored toner images must be sequentially deposited in precisely registered locations on the photoreceptor belt 60. More specifically, copy/print quality is adversely affected because imaging takes place on one part of the photoreceptor belt 60 simultaneously with the cleaning blade colliding with the flap while cleaning another part of the photoreceptor belt 60.

The velocity variation problems encountered with the photoreceptor belt 60 are not exclusively limited to the photoreceptor belt 60 forming the seam delamination 56. The discontinuity in cross-sectional thickness of the photoreceptor belt 60 at the first and second junctions 50 and 52 can also create unwanted velocity variations, particularly when the photoreceptor belt 60 bends over small diameter rollers of a belt module or between two closely adjacent rollers. Moreover, the second splash 40 underneath the seam 32 can collide with devices such as acoustic image transfer assist subsystems during dynamic belt cycling, and cause additional unacceptable velocity disturbances.

This invention provides a flexible electrostatographic imaging member web, electrostatographic imaging members formed from the imaging member web, and well as processes of making the imaging member web and imaging members.

The electrostatographic imaging member web comprises a flexible support substrate and at least one coating layer comprising a film forming thermoplastic polymer over the substrate, but in embodiments does not include an anti-curl backing layer over the reverse side of the substrate. The electrostatographic imaging member web can be formed by exemplary embodiments of the process of this invention, which include a web treating step that is performed off-line for a production imaging member web.

In exemplary embodiments of electrophotographic imaging member webs or photoreceptor webs of this invention, the web treating step is performed after a charge transport layer has been formed over the substrate.

Figure 4:
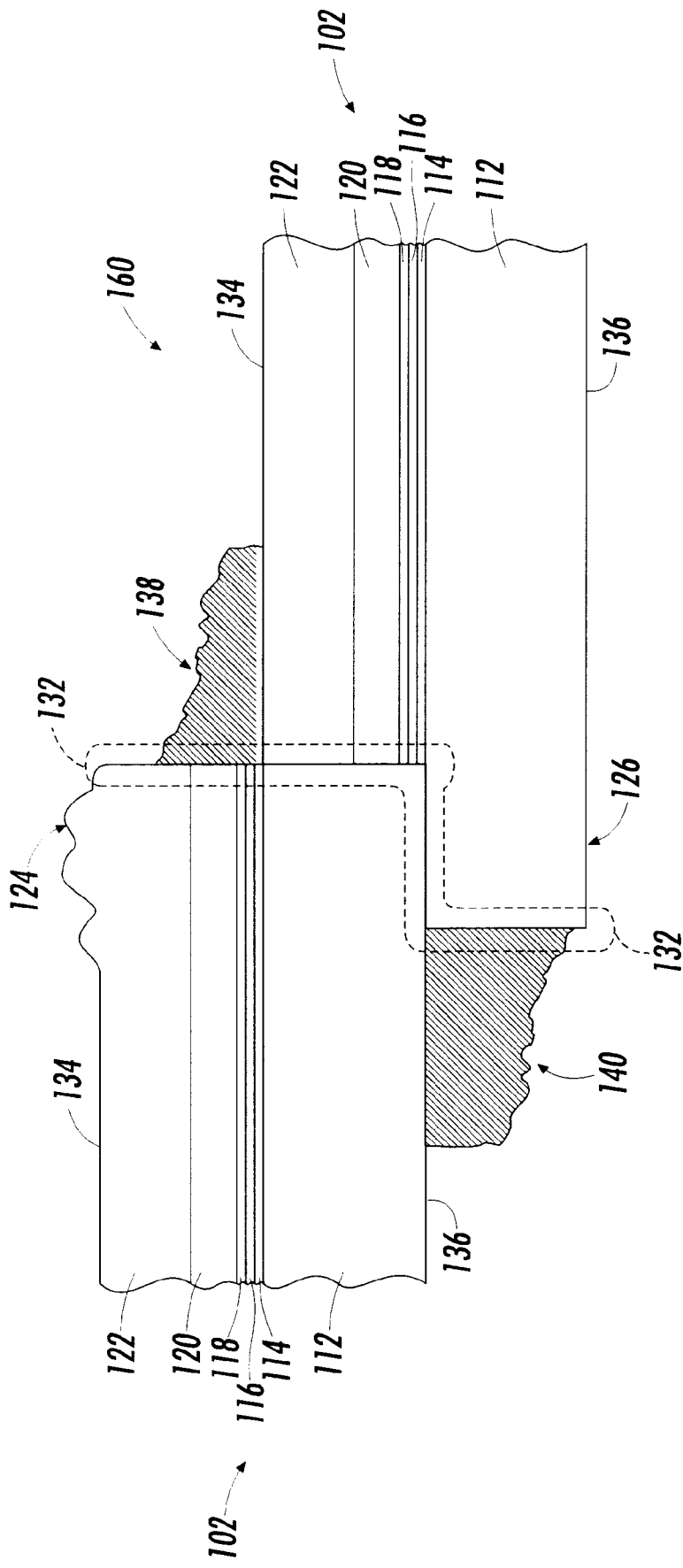
FIG. 4 is a side partial cross-sectional view of an exemplary embodiment of a seamed electrophotographic imaging member belt or photoreceptor belt of this invention having no anti-curl layer and including a stress released charge transport layer formed according to an exemplary embodiment of the process of this invention.

FIG. 4 shows an exemplary embodiment of a seamed photoreceptor belt 160 formed by using an electrophotographic imaging member web that has undergone the treatment process according to this invention. The seamed photoreceptor belt 160 comprises a photoreceptor 102, including a support substrate 112 and multiple layers 114–122 formed over the substrate 112. These layers include an electrically conductive layer 114, a charge blocking layer 116, an adhesive layer 118, a charge generating layer 120 and a charge transport layer 122. In contrast to the seamed photoreceptor belt 60 described above, the seamed photoreceptor belt 160 does not include an anti-curl layer, such as the anti-curl layer 30, formed on the support substrate 112.

FIG. 4 shows an ultrasonically welded seam 132 formed from the photoreceptor 102 that does not include a flexible anti-curl backing layer, and that is prepared by an exemplary embodiment of a process of this invention. In comparison to the welded seam 32 of the photoreceptor belt 60 illustrated in FIGS. 2 and 3, the seam 132 used in exemplary embodiments of the process of this invention has a reduced overlap thickness and also a smaller first seam splash 138 and second seam splash 140.

The seam 132 configuration formed from the photoreceptor 102 according to exemplary embodiments of this invention has improved properties. Particularly, the seam 132 has a higher seam rupture strength than the seam 32 of the photoreceptor belt 60 shown in FIG. 2. This improved seam 132 rupture strength results from it being formed using the photoreceptor 102 that includes no anti-curl backing layer. Consequently, one less layer is melted during the joining process used to form the seam 132. The seam 132 provides effective overlap fusing during ultrasonic seam welding process.

Support substrate 112 can be opaque or substantially transparent, and can comprise any suitable photoreceptor substrate material having desired properties. The support substrate 112 comprises a layer of an electrically non-conductive or conductive material, of an inorganic or an organic composition. Exemplary electrically non-conducting materials that can be used to form the substrate 112 include various resins including polyesters, polycarbonates, polyamides, polyurethanes, polysulfones and the like, which provide flexible, thin imaging member webs. The electrically insulating or conductive support substrate 112 should be flexible. Desirably, the flexible belt shaped substrate comprises a commercially available biaxially oriented polyester such as Mylar, available from E.I. du Pont de Nemours & Co.; Melinex available from ICI Americas, Inc.; or Hostaphan, available from American Hoechst Corporation.

The thickness of the support substrate 112 can be selected based on various considerations, including mechanical properties such as beam strength, and also economic considerations. The support substrate 112 can have a thickness ranging, for example, from about 50 $\mu$m to about 175 $\mu$m. In one exemplary embodiment of the flexible photoreceptor 102, the thickness of the support substrate 112 is between about 65 $\mu$m and about 150 $\mu$m, and desirably between about 75 $\mu$m and about 100 $\mu$m, for optimum flexibility and minimum stretch when cycled around small diameter rollers, e.g., 19 mm diameter rollers.

The electrically conductive layer 114 can comprise any suitable electrically conductive material. The electrically conductive layer 114 is formed over the support substrate 112 by any suitable coating technique, such as a vacuum deposition technique. Suitable exemplary metals for forming a metal electrically conductive layer 114 include aluminum, zirconium, niobium, tantalum, vanadium and hafnium, titanium, nickel, stainless steel, chromium, tungsten, molybdenum and the like. Regardless of the technique employed to form the metal layer, a thin layer of metal oxide normally forms on the outer surface of most metals upon exposure to air. Thus, when other layers overlying the metal layer are characterized as "contiguous" layers, these overlying contiguous layers can contact a thin metal oxide layer formed over the outer surface of the oxidized electrically conductive layer 114.

Generally, for rear erase exposure, a conductive layer light transparency of at least about 15% is desirable.

The electrically conductive layer 114 can optionally comprise materials other than metals. Other exemplary suitable materials for the electrically conductive layer 114 can comprise combinations of materials such as conductive indium tin oxide (ITO) as a transparent layer for light having a wavelength between about 4000 Å and about 7000 Å, transparent copper iodide (CuI) or conductive carbon black, dispersed in a plastic binder as an opaque conductive layer.

The electrically conductive layer 114 can have any suitable thickness. This thickness can vary over a substantially wide range depending on the optical transparency and degree of flexibility desired for the electrophotographic photoreceptor 100. Accordingly, for a flexible photoresponsive imaging device such as the photoreceptor belt 160, the thickness of the electrically conductive layer 114 can be from about 20 Å to about 750 Å, and more desirably from about 100 Å to about 200 Å, for a satisfactory combination of electrical conductivity, flexibility and light transmission.

After formation of the electrically conductive layer 114, the charge blocking layer 116 can be applied over the electrically conductive layer 114. The charge blocking layer 116 can comprise any suitable material capable of forming an electronic barrier to holes between the adjacent photoconductive layer and the underlying electrically conductive layer 114. The charge blocking layer 116 can comprise, for example, nitrogen containing siloxanes or nitrogen containing titanium compounds, as disclosed in U.S. Pat. Nos. 4,291,110; 4,338,387; 4,286,033 and 4,291,110, each incorporated herein by reference in its entirety. A desirable charge blocking layer 116 comprises a reaction product between a hydrolyzed silane and the oxidized surface of a metal ground plane layer.

The charge blocking layer 116 can be applied by any suitable conventional technique such as spraying, dip coating, draw bar coating, gravure coating, silk screening, air knife coating, reverse roll coating, vacuum deposition, chemical treatment and the like. For convenience in obtaining thin layers, the charge blocking layer 116 is desirably applied in a dilute solution, with the solvent being removed after deposition of the coating by any conventional technique such as vacuum, heating and the like. The charge blocking layer 116 should be continuous and typically has a thickness of less than about 0.2 $\mu$m to achieve a satisfactory residual voltage level.

The adhesive layer 118 is an optional layer that can be applied over the charge blocking layer 116. Any suitable adhesive layer material can be utilized for the adhesive layer 118. Exemplary adhesive layer materials include, for example, polyesters such as du Pont 49,000 (available from E.I. du Pont de Nemours and Company) and Vitel PE100 (available from Goodyear Tire & Rubber), polyurethanes and the like. The adhesive layer 118 can have a thickness from about 0.05 $\mu$m to about 0.3 $\mu$m. Suitable techniques for applying the adhesive layer 118 coating mixture to the charge blocking layer 116 include, for example, spraying, dip coating, roll coating, wire wound rod coating, gravure coating, Bird applicator coating and the like. The deposited coating can be dried by any suitable conventional technique such as oven drying, infra red radiation drying, air drying and the like.

Any suitable photogenerating layer material can be applied over the adhesive layer 118 to form the charge generating layer 120. Typical photogenerating layer materials include inorganic photoconductive particles such as amorphous selenium, trigonal selenium and selenium alloys such as selenium-tellurium, selenium-tellurium-arsenic, selenium arsenide and mixtures thereof, and organic photoconductive particles including various phthalocyanine pigments such as the X-form of metal free phthalocyanine, metal phthalocyanines such as vanadyl phthalocyanine and copper phthalocyanine, dibromoanthanthrone, squarylium, quinacridones available from du Pont under the tradename Monastral Red, Monastral violet and Monastral Red Y, Vat orange 1 and Vat orange 3 trade names for dibromo anthanthrone pigments, benzimidazole perylene, substituted 2,4-diamino-triazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet and Indofast Orange, and the like dispersed in a film forming polymeric binder. Multi-photogenerating layer compositions can also be utilized. Examples of such multi-layer configuration are described in U.S. Pat. No. 4,415,639, incorporated herein by reference in its entirety.

Charge generating materials comprising particles, or layers comprising a photoconductive material such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like, and mixtures thereof, are especially suitable for the charge generating layer 120 because of their sensitivity to white light. Vanadyl phthalocyanine, metal free phthalocyanine and tellurium alloys are also desirable because these materials provide the additional benefit of being sensitive to infrared light.

Any suitable polymeric film forming binder material can be used as the matrix in the charge generating layer 120. Typical polymeric film forming materials include those described, for example, in U.S. Pat. No. 3,121,006, incorporated herein by reference in its entirety. Typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazole, and the like. These polymers can be block, random or alternating copolymers.

The photogenerating composition or pigment can be included in the resinous binder composition in any suitable amount. Generally, from about 5 percent by volume to about 90 percent by volume of the photogenerating pigment is dispersed in about 10 percent by volume to about 95 percent by volume of the resinous binder. Desirably, from about 20 percent by volume to about 30 percent by volume of the photogenerating pigment is dispersed in about 70 percent by volume to about 80 percent by volume of the resinous binder composition.

The charge generating layer 120 comprising photoconductive compositions and/or pigments and the resinous binder material has a typical thickness of from about 0.1 $\mu$m to about 5 $\mu$m, and more desirably from about 0.3 $\mu$m to about 3 $\mu$m. The charge generating layer 120 thickness is related to the binder content; higher binder contents generally require thicker layers to achieve satisfactory photogeneration.

Any suitable technique can be utilized to mix and then apply the photogenerating material coating mixture. Typical application techniques include spraying, dip coating, roll coating, wire wound rod coating and the like. The deposited coating can be dried by any suitable technique such as oven drying, infra red radiation drying, air drying and the like.

The active charge transport layer 122 can comprise an activating compound dispersed in an electrically inactive polymeric material to make these polymeric materials electrically active. These activating compounds can be added to polymeric materials that are incapable of supporting the injection of photogenerated holes from the charge generating layer 120 and also incapable of allowing the transport of these holes through the polymeric materials. This addition converts the electrically inactive polymeric material to a material capable of supporting the injection of photogenerated holes from the charge generating layer 120 and also capable of allowing the transport of these holes through the charge transport layer 122, in order to discharge the surface charge on the charge transport layer 120. In a charge transport layer 122 included in an exemplary embodiment of the photoreceptor 102 of this invention, one of the two electrically operative layers in the multilayered photoconductor comprises from about 25 wt % to about 75 wt % of at least one charge transporting aromatic amine compound, and between about 75 wt % and about 25 wt % of a polymeric film forming resin in which the aromatic amine is soluble.

The charge transport layer 122 forming mixture can comprise an aromatic amine compound. Examples of charge transporting aromatic amines represented by the structural formulae above for charge transport layers capable of supporting the injection of photogenerated holes of the charge generating layer 120 and transporting the holes through the charge transport layer 122 include triphenylmethane, bis(4-diethylamine-2-methylphenyl)phenylmethane, 4'-4"-bis(diethylamino)-2',2"-dimethyltriphenylmethane, N,N'-bis(alkylphenyl)-[1,1'-biphenyl]-4,4'-diamine, wherein the alkyl is, for example, methyl, ethyl, propyl, n-butyl, etc., N,N'-diphenyl-N,N'-bis(chlorophenyl)-[1,1'-biphenyl]-4,4'-diamine, N,N'-diphenyl-N,N'-bis(3"-methylphenyl)-(1,1'-biphenyl)-4,4'-diamine, and the like dispersed in an inactive resin binder.

Any suitable inactive thermoplastic resin binder soluble in a suitable solvent such as methylene chloride can be used in exemplary embodiments of the process of this invention to form the thermoplastic polymer matrix of the charge transport layer 122 of the photoreceptor 102. Typical inactive resin binders include polycarbonate resin, polyvinylcarbazole, polyester, polyarylate, polyacrylate, polyether, polysulfone, polystyrene, and the like. Molecular weights of these materials can vary from about 20,000 to about 150,000.

Any suitable technique can be used to mix and then apply the charge transport layer 122 coating mixture over the charge generating layer 120. Typical application techniques include spraying, dip coating, roll coating, wire wound rod coating and the like. The deposited coating can be dried by any suitable conventional technique such as oven drying, infra red radiation drying, air drying and the like, to form the charge transport layer 122.

Generally, the thickness of the charge transport layer 122 is from about 10 $\mu$m to about 50 $\mu$m. However, thicknesses outside this range can also be used. The charge transport layer 122 should be an insulator to the extent that the electrostatic charge placed on the charge transport layer 122 is not conducted in the absence of illumination at a rate sufficient to prevent formation and retention of an electrostatic latent image thereon. In general, the ratio of the thickness of the charge transport layer 122 to the charge generating layer 120 is desirably maintained at from about 2:1 to 200:1, and in some instances as great as 400:1.

The preferred electrically inactive resin materials are polycarbonate resins having a molecular weight from about 20,000 to about 150,000, more desirably from about 50,000 to about 120,000. Suitable materials for the electrically inactive resin material include poly(4,4'-dipropylidene-diphenylene carbonate) with a molecular weight of from about 35,000 to about 40,000, available as Lexan 145 from General Electric Company; poly(4,4'-isopropylidene-diphenylene carbonate) with a molecular weight of from about 40,000 to about 45,000, available as Lexan 141 from the General Electric Company; a polycarbonate resin having a molecular weight of from about 50,000 to about 120,000, available as Makrolon from Farbenfabricken Bayer A. G.; and a polycarbonate resin having a molecular weight of from about 20,000 to about 50,000 available as Merlon from Mobay Chemical Company.

Examples of photosensitive members having at least two electrically operative layers include the charge generating layer and diamine containing transport layer members disclosed in U.S. Pat. No. 4,265,990; 4,233,384; 4,306,008; 4,299,897 and 4,439,507, each incorporated herein by reference in its entirety. The photoreceptor 102 can comprise, for example, a charge generating layer 120 sandwiched between a conductive surface and a charge transport layer 122 as described above, or alternatively a charge transport layer 122 sandwiched between a conductive surface and a charge generating layer 120.

If desired, the charge transport layer 122 can comprise electrically active resin materials or mixtures of inactive resin materials with activating compounds. Electrically active resin materials are well known in the art. Typical electrically active resin materials include, for example, polymeric arylamine compounds and related polymers disclosed in U.S. Pat. Nos. 4,801,517; 4,806,444; 4,818,650; 4,806,443 and 5,030,532, each incorporated herein by reference in its entirety; and polyvinylcarbazole and derivatives of Lewis acids described in U.S. Pat. No. 4,302,521, incorporated herein by reference in its entirety. Electrically active polymers also include polysilylenes such as poly (methylphenyl silylene), poly(methylphenyl silylene-co-dimethyl silylene), poly(cyclohexylmethyl silylene), poly (tertiary-butylmethyl silylene), poly(phenylethyl silylene), poly(n-propylmethyl silylene), poly(p-tolylmethyl silylene), poly(cyclotrimethylene silylene), poly(cyclotetramethylene silylene), poly(cyclopentamethylene silylene), poly(di-t-butyl silylene-co-di-methyl silylene), poly(diphenyl silylene-co-phenylmethyl silylene), poly(cyanoethylmethyl silylene) and the like. Vinyl-aromatic polymers such as polyvinyl anthracene, polyacenaphthylene; formaldehyde condensation products with various aromatics such as condensates of formaldehyde and 3-bromopyrene; 2,4,7-trinitrofluoreone, and 3,6-dinitro-N-t-butylnaphthalimide, as described in U.S. Pat. No. 3,972,717, incorporated herein by reference in its entirety. Other suitable polymeric charge transport materials include poly-1-vinylpyrene, poly-9-vinylanthracene, poly-9-(4-pentenyl)-carbazole, poly-9-(5-hexyl)-carbazole, polymethylene pyrene, poly-1-(pyrenyl)-butadiene, polymers such as alkyl, nitro, amino, halogen, and hydroxy substitute polymers such as poly-3-amino carbazole, 1,3-dibromo-poly-N-vinyl carbazole and 3,6-dibromo-poly-N-vinyl carbazole and numerous other transparent organic polymeric transport materials as described in U.S. Pat. No. 3,870,516, incorporated herein by reference in its entirety.

The photoreceptor 102 can optionally include other layers such as a conventional electrically conductive ground strip along one edge of the photoreceptor belt 160 in contact with the electrically conductive layer 114, charge blocking layer 116, adhesive layer 118 or charge generating layer 120, to facilitate connection of the electrically conductive layer 114 of the photoreceptor 102 to ground or to an electrical bias. Ground strips are well known in the art and can comprise conductive particles dispersed in a film forming binder.

In exemplary embodiments of electrographic imaging members of this invention, a flexible dielectric layer overlying the electrically conductive layer 114 can be substituted for the active photoconductive layers, such as, for example, the charge generating layer 120 and the charge transport layer 122. Any suitable flexible, electrically insulating, thermoplastic dielectric polymer matrix material can be used in the dielectric layer of these exemplary embodiments of the electrographic imaging member.

In exemplary embodiments of the process of forming the photoreceptor 102 of this invention, a photoreceptor 102 in the form of webstock and having no anti-curl coating is cut to form photoreceptor 102 sheets. For example, the webstock can be cut to form rectangular or other desirably shaped imaging member cut sheets. The imaging member cut sheets are each rolled up, in the longer dimension direction with the charge transport layer 122 facing outwardly, into tubes such as 1½ inch, 1 inch, ¾ inch and ½ inch tubes. These tubes are then placed in a heated environment, such as in an air circulation oven, at a suitable temperature. The temperature selection is dependent on the glass transition temperature of the materials forming the charge transport layer 122. A typical temperature selection is about 90° C. (about 7° C. above the glass transition temperature of the charge transport layer), applied for a suitable amount of time to heat the charge transport layer 122 to a temperature above its glass transition temperature. Although the heat exposure time required for a rolled up photoreceptor tube to reach the temperature of the heated environment depends on the mass of the photoreceptor tube, a typical time for this heating process is about 2 minutes.

After being heated to a temperature above the glass transition temperature, the rolled up photoreceptor tubes are subsequently cooled to a temperature below the glass transition temperature. Typically, the tubes are cooled to about room ambient temperature.

When fabricated into seamed belts using an ultrasonic welding process, the belt edge curling observed in these photoreceptors 102, having varying diameters of curvature for the treatment process according to this invention, are notably different. The edge curling observed for the belt prepared: From the 1½ inch heat treated photoreceptor 102 tube is slight but substantial; from the 1 inch photoreceptor 102 tube is minimally upward; for the ¾ inch photoreceptor 102 tube is notably flat; and for the ½ inch photoreceptor 102 tube is, however, slightly downward. By comparison, a seamed control photoreceptor belt similar to belt 160, without an anti-curl backing layer, but not subjected to the treatment according to this invention shows an unacceptably large degree of upward edge curling which can obstruct an imager's subsystems function during belt cycling test.

Application of an anti-curl backing layer increases the overall thickness of the photoreceptor 10 by about 20 percent over that of the photoreceptor 102. Because elimination of an anti-curl backing layer in the photoreceptor 102 decreases its overall thickness and reduces induced bending stress when the fabricated photoreceptor belt 160 flexes over belt support module rollers during imager operation, the onset of charge transport layer 122 cracking due to fatigue cycling is significantly extended. Furthermore, the absence of an anti-curl backing layer at the seam 132 leads to a decrease in seam overlapped region thickness as well as the reduction in volume of the molten mass ejection from the overlapped joint to form the seam splashes 138 and 140 during the ultrasonic seam welding process. In addition, thinner seam overlap coupled with smaller seam splashes can effect the suppression of the fatigue seam cracking/ delamination problem that occurs in known seamed belts.

Exemplary embodiments of the processes of treating electrostatographic imaging member webs of this invention comprise treating of the flexible photoreceptor 102 web to achieve stress relief of the charge transport layer 122. Stress relieving the charge transport layer 122 eliminates the need for an anti-curl backing layer as described above. The process comprises bending the entire photoreceptor 102 web, with the charge transport layer 122 facing outwardly, in an arc having an imaginary axis which traverses the width of the photoreceptor 102. The arc axis is substantially perpendicular to the longitudinal direction of the long edges of the photoreceptor 102 web. The arc is visible when viewing the edge of the photoreceptor 102 in a direction perpendicular to the longitudinal direction of the long edges of the web.

In the seamed photoreceptor belt 160, shown in FIG. 4, prepared from the photoreceptor 102 web having no anti-curl backing layer according to exemplary embodiments of the process of this invention, the thickness of the seam 132 is substantially reduced and the size of the seam splashes 138 and 140 is reduced by at least about 40% as compared to the splashes 38 and 40 of the seamed photoreceptor belt 60, having an anti-curl backing layer 30, as illustrated in FIG. 2. As a consequence, it has also been found that the reduced seam 132 thickness with smaller splashes 138 and 140 reduces mechanical interaction against cleaning blades, acoustic transfer assist devices, and other interacting subsystems function, as well as suppresses seam 132 cracking/ delamination failure problems when the photoreceptor belt 160 flexes over small diameter support rollers during electrophotographic imaging and cleaning processes. Furthermore, the thinner photoreceptor 102 configuration coupled with charge transport layer 122 stress release through the process of this invention can significantly extend the fatigue cycling life of the photoreceptor belt 160 over small diameter belt support rollers without encountering premature charge transport layer 122 cracking or liquid developer exposure induced cracking during bending.

It is important to emphasize that when the photoreceptor belt 160, having been through the stress release process according to this invention to eliminate the need of an anti-curl backing layer, was subjected to dynamic cycling in a belt supporting module including an active steering/ tension roll for the belt walk control, the photoreceptor belt 160 did not form belt ripples after up to 30,000 cycles of cyclic testing.

In sharp contrast, a seamed photoreceptor belt having the structure of the photoreceptor belt 60 was tested in the same belt support module and exhibited the onset of belt ripples after only about 160 cycles.

Thus, the photoreceptor belt 160 without an anti-curl backing layer formed by exemplary embodiments of processes of this invention provides important physical, mechanical and economical advantages. Furthermore, the photoreceptor belt 160 formed by exemplary embodiments of the processes of this invention are at least substantially free of stress in the charge transport layer 122 and, thus, are especially desirable in systems utilizing an active belt steering roller and small diameter belt support rollers.

Figure 5:
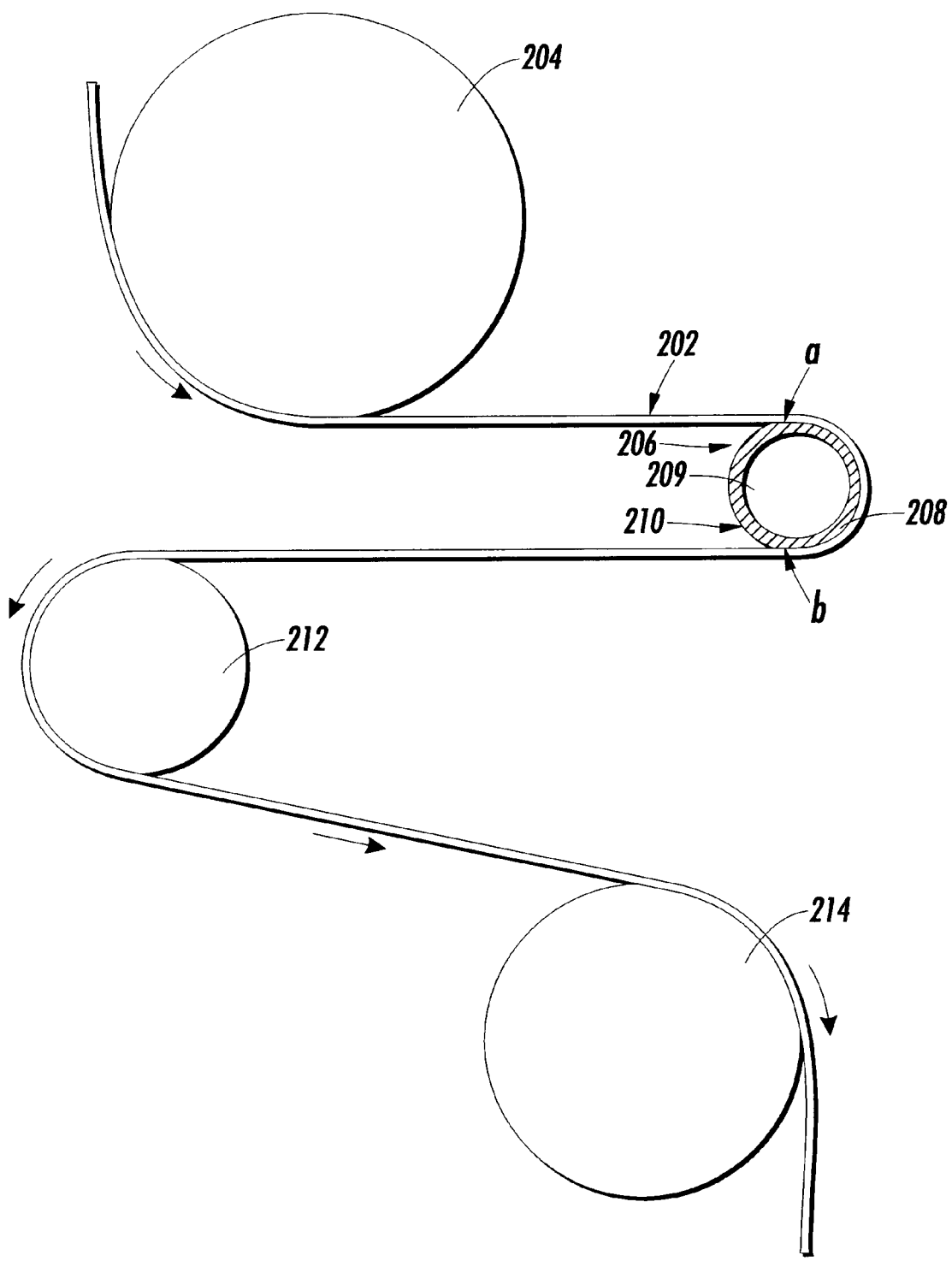
FIG. 5 is a schematic illustration of an exemplary embodiment of a stress release treatment method according to this invention, in which an electrophotographic imaging member roll-up supply web, having no anti-curl backing layer, is subjected to a heating and cooling treatment process.

FIG. 5 shows an exemplary embodiment of a process of this invention for treating a flexible, electrostatographic imaging member web 202, having no anti-curl backing layer. As explained above, the imaging member web 202 can either be an electrophotographic or electrographic imaging member web.

This invention process is performed to relieve the internal stress/strain in the charge transport layer 122 in the photoreceptor 102 for electrophotographic imaging member web treatment, and to relieve internal stress/strain in the imaging layer for electrographic imaging member web treatment as well. However, for simplicity, the process will be described with respect to the treatment of an electrophotographic imaging member web 202 having the same structure as the photoreceptor 102 shown in FIG. 4.

Referring to FIG. 5, the imaging member web 202 is unwound from a roll of webstock 204 so that the charge transport layer 122 faces outwardly. The imaging member web 202 is transported over a treatment processing tube's surface which bends the imaging member web 202 into an arc shape. The arcuate surface can be the arcuate outer surface 210 of the treatment processing tube 206. The outer surface 210 has a circular cross-section. The processing tube 206 includes an annular shell 208 and an inner chamber 209. As shown, the imaging member web 202, having no anti-curl backing layer, is bent into the arc shape and conformed to the outer surface 210 of the processing tube 206, as transported and then parked over the processing tube 206; in this manner, the imaging member web 202 makes contact with the outer surface 210 of the processing tube 206 over an angular range between the points a and b. This illustrated angular range is about 180°, or π radians.

The angular range of contact of imaging member web 202 with the outer surface 210 is not, however, limited to about 180°. That is, the angular range of contact can range from about 90° to a wrapped angle slightly less than 360° in exemplary embodiments of the process of this invention.

In addition, the arcuate surface over which the imaging member web 202 is bent into an arc is not limited to semi-circular surfaces, such as that illustrated in FIG. 5, of the outer surface 210. For example, the arcuate surface can alternatively have other like shapes such as oblong circular cross-sectional shapes.

Furthermore, the processing tube 206 can be rotatable or non-rotatable. Exemplary embodiments of rotatable processing tubes 206 can be driven by a suitable drive such as a motor. Alternatively, the rotatable processing tube 206 can be freely rotatable about an axis, such that the processing tube is rotated by the interfacial frictional force generated by the movement of the imaging member web 202 as it is transported over the outer surface 210.

The processing tube 206 provides the advantageous treatment functions of heating and cooling the imaging member web 202 when it is stopped in the parked state over the processing tube 206. The annular shell 208 of the processing tube 206 is heated to a selected temperature by a suitable heating source, so that the outer surface 210 in contact with the imaging member web 202 heats the imaging member web 202. For example, a heated fluid can be flowed through the inner chamber 209 of the processing tube 206 to heat the annular shell 208 as well as its outer surface 210 to effect the heating up of the segment of the imaging web that is parked directly over the processing tube 206. The fluid can be a gas or a liquid. Typically, water or super heated water or steam is preferred because it has a suitably large heat capacity.

In order to provide suitable heating of the imaging member web 202, the processing tube 206 is formed of a material that has good thermal conductivity. Suitable materials for the processing tube 206 include, for example, metals such as aluminum and copper.

It will be understood by those skilled in the art that the processing tube 206 can alternatively be heated by other energy sources than such heated fluids. For example, the processing tube 206 can be heated by passing a sufficient current through the annular shell 208 to heat the annular shell 208 to the desired temperature.

The heated outer surface 210 heats the imaging member web 202 such that the temperature of the charge transport layer 122 is raised to a temperature that is at least about several degrees above the glass transition temperature of the material forming the charge transport layer 122. For example, the charge transport layer 122 is desirably heated to a temperature that is about 4–10° C. above the glass transition temperature. The glass transition temperature of the charge transport layers of known electrophotographic imaging members may be in a range from about 45° C. to about 150° C. depending on the material forming the charge transport layer. However, a typical charge transport layer has a glass transition temperature, Tg, of about 85° C. Accordingly, the outer surface 210 of the processing tube 206 can be heated to raise the charge transport layer 122 temperature to from about 89–95° C. Heating the charge transport layer 122 above about 95° C. does not provide any significant additional benefits and, accordingly, is less desirable.

For known electrographic imaging members, the Tg of the imaging layers is between about 100° C. and about 170° C. Typical known imaging layers have a Tg value of about 156° C.

Typically, the imaging member web 202 has a thickness of about 0.08 mm to about 0.2 mm. Such thicknesses of the imaging member web 202 can be rapidly heated so that the charge transport layer 122 temperature reaches a suitable temperature in less than about 1 second, which is typically achieved in significantly short times. Because the imaging member is very thin, for example 0.106 mm in thickness, and has a small mass, the heating up of this imaging member web segment that is parked over the tube 206 to the equilibrium temperature of the heating fluid will typically take only about 0.125 second.

After the charge transport layer 122 is heated to the desired temperature above the glass transition temperature, the imaging member web 202 is then cooled to a temperature below the glass transition temperature. To achieve this cooling, the processing tube 206 can be cooled by introducing a cooled fluid into the inner chamber 209 of the processing tube 206. The cooled fluid cools the annular shell 208, which then decreases the temperature of charge transport layer 122 down to the desired low temperature below its glass transition temperature. Typically, the charge transport layer 122 is cooled down to about room ambient temperature. Desirably, the charge transport layer 122 is cooled quickly to the desired low temperature. Such quick cooling can increase processing efficiency and thereby reduce the cycle-time of the treating process.

The cooled imaging member web 202 is subsequently advanced by a distance equal to the distance between points a and b to effect the next cycle of the imaging member segmental treatment process. After the treatment cycle, the imaging member web 202 is then moved over an arcuate surface of a roller such as the free rotation idle roller 212, to change the web's transporting direction, and then wound onto a take-up roll 214.

By advancing the imaging member web 202 by this distance, a new segment of the imaging member web 202 to be subjected to the heating and cooling process is moved so that it contacts the outer surface 210 of the processing tube 206 between the points a and b. The movement of the imaging member web 202 is stopped so this new segment is parked directly over the processing tube 206. This new segment is then subjected to the heating and cooling treatment cycle as described above.

The above-described heating and cooling process is repeated until the desired portion, typically the entire length of the imaging member web 202, has been treated to at least substantially remove the internal cross-web (transverse) stress/strain from the charge transport layer 122.

The processing tube 206 for the stress-release treatment depicted in FIG. 5 has an diameter that can range from about 0.5 inch to about 1.5 inch. A diameter of from about 0.5 inch and about 0.75 inch is particularly preferred because it has been found to give excellent results. A processing tube 206 outer diameter of from about 0.5 inch to about 1.5 inch is suitable for the treating imaging member web 202 having a broad range of thicknesses, such as from about 0.08 mm to about 0.2 mm.

Because the above-described heating and cooling process for the imaging member web 202 at least substantially removes the internal transverse tensile stress/strain from the charge transport layer 122, the outermost charge transport layer 122 of the imaging member does not exert a tension pulling force from both imaging member web edges toward the center, which thereby eliminates the current imaging member belt edge curl problem. That is, the charge transport layer 122 is substantially stress/strain free in the cross web direction to render transverse direction imaging member belt flatness. The charge transport layer can be considered as in a substantially stress/strain free state when its internal strain is reduced to a level not more than 0.01% after the imaging member has been subjected to the above-described treatment process according to this invention.

In exemplary embodiments of the process of this invention, electrographic imaging member webs can also be treated by the above-described heating and cooling process to substantially eliminate transverse tensile stress in the imaging layer, so as to provide improved flatness.

Electrophotographic imaging member webs that were treated by the charge transport layer stress release treatment according to exemplary embodiments of this invention to eliminate the need of an anti-curl backing layer, displayed no photoreceptor belt surface cracking when exposed to liquid developers, or as a result of extended dynamic belt fatigue during imaging machine cycling.

Anti-curl baking layer free photoreceptor belts 160 formed from photoreceptors 102 treated by exemplary embodiments of the process of this invention that included an electrically active charge transport polymer layer were tested and found to withstand belt fatigue cycling in a two 1-inch-diameter roller belt module with constant exposure to a liquid developer without developing charge transport layer cracking in up to 300,000 cycles of testing.

In contrast, a photoreceptor belt having the structure of the photoreceptor belt 60 and without subjected to the present invention processing treatment exhibited instantaneous charge transport layer cracking when it was bent over a 1 inch (2.54 cm) diameter roller and exposed to the liquid developer.

Although the above description of exemplary embodiments of the electrostatographic imaging member and methods of making the electrostatographic imaging member of this invention referred specifically to only electrophotographic imaging members 160, the embodiments of this invention can also be used for electrographic imaging members as well.

This invention will further be illustrated in the following, non-limiting examples. The examples are intended to be illustrative only of exemplary embodiments of the processes of this invention, and this invention is not intended to be limited to the materials, conditions, process parameters and the like used in these examples.

EXAMPLE 1

A photoreceptor web was prepared by providing a titanium coated polyester substrate having a thickness of 3 mils (76.2 $\mu$m) and applying a silane hole blocking layer having a dry thickness of 0.05 $\mu$m to the substrate. An adhesive interface layer comprising du Pont 49,000 polyester was then prepared by applying over the hole blocking layer to yield a polyester adhesive interface layer having a dry thickness of 0.07 $\mu$m. The adhesive interface layer was then coated with a charge generating layer comprising 7.5% by volume trigonal selenium, 25% by volume N,N'-diphenyl-N,N'-bis(3-methylphenyl)-1,1'-biphenyl-4,4'-diamine, and 67.5% by volume polyvinylcarbazole. This charge generating layer had a dry thickness of about 2 $\mu$m. The coated imaging member web was overcoated by extruding a charge transport layer coating material. The charge transport layer comprised N,N'-diphenyl-N,N'-bis(3-methylphenyl)-1,1'-biphenyl-4,4'-diamine and Makrolon 5705, a polycarbonate resin at a weight ratio of 1:1. The charge transport layer had a thickness of 24 $\mu$m after drying. After the completion of the charge transport layer coating, the photoreceptor web exhibited spontaneous upward curling when in an unrestrained free state. To achieve the desired imaging member flat shape, a 13.8 $\mu$m thick anti-curl backing layer containing 90 wt % Makrolon 5705 polycarbonate resin, 8 wt % of Goodyear polyester Vitel PE-200, and 2 wt % of silane treated microcrystalline silica was applied to the rear surface (the side opposite to the charge generating layer and the charge transport layer) of the photoreceptor web, i.e. on the uncoated side of the substrate layer. The final dried photoreceptor web had a total thickness of about 116 $\mu$m.

EXAMPLE 2

A photoreceptor web was prepared using the same materials and following the same procedures as described above in Example 1, except that no anti-curl backing layer was applied to the rear surface of the substrate. The photoreceptor web exhibited significant upward curling; if unrestrained, a cut piece of this photoreceptor web would spontaneously curl into a 1½ inch roll.

EXAMPLE 3

To remove the upward curling effect exhibited by the photoreceptor web of Example 2, four rectangular shaped photoreceptor web sheets 353 mm wide by 837 mm long were cut from the photoreceptor web of Example 2, without an anti-curl backing layer. With the charge transport layer facing outwardly, these photoreceptor web sheets were rolled up, in the long dimension direction, into tubes having respective diameters of about 1.5 inch, 1 inch, 0.75 inch and 0.5 inch. The tubes were then heated to an elevated temperature of about 90° C. (about 5° C. above the glass transition temperature Tg of the charge transport layer material) in an air circulating oven. The heated tubes were then cooled, in ambient air while maintained in the tube shape, to room ambient temperature to complete the process of charge transport layer stress release.

EXAMPLE 4

The opposite ends of each processed photoreceptor web sheet (without an anti-curl backing layer) of Example 3 were overlapped over a distance of about 1 mm, similarly as illustrated in FIG. 1. The opposite ends were joined by a conventional ultrasonic welding technique using 40 kHz sonic energy supplied to a welding horn to form a seamed photoreceptor belt 160 as shown in FIG. 4.

A photoreceptor web of Example 1, having the same dimensions as the photoreceptor web formed according to the exemplary embodiments of the process of this invention described in the preceding Examples, was formed into a seamed photoreceptor belt configuration similar to that illustrated in FIG. 2 and used as a control to allow physical and mechanical comparison of these two photoreceptor belts.

When each was mounted onto a belt support module, the 1.5 inch diameter treated belt showed only a small degree of upward edge curling. The edge curling observed for the 1.0 inch diameter treated belt was substantially suppressed. However, the edge curling was totally absent for the 0.75 inch diameter treated belt. But, it was noted that the edge curling for the 0.5 inch diameter treated belt was in a slightly downward direction. The photoreceptor belt control formed from the photoreceptor web of Example 1 was totally free of curling.

The physical and mechanical measurements for the seams of the photoreceptor belts formed according to exemplary embodiments of this invention demonstrated good results. Because these exemplary photoreceptor belts did not include an anti-curl backing layer, the imaging members had one less coating layer to melt during the ultrasonic seam welding technique to form the seam. Accordingly, a greater amount of the kinetic energy that was provided by the mechanical action of the horn was available for absorption at the overlap joint to effect substrate to substrate fusing. This increased amount of kinetic energy and improved fusing, demonstrated by the results of the increase in seam rupture strength, fatigue seam cracking/delamination resistance and the realization of total seam thickness and splash size reduction as compared to the seam of the control photoreceptor belt counterpart are added benefits achieved by employing the processing treatment of this invention.

EXAMPLE 5

The photoreceptor webs of Examples 1 and 2 were each cut to form two rectangular photoreceptor web sheets having a 13.78 inch width and a 32.95 inch length. These photoreceptor web sheets were ultrasonically seam welded to form photoreceptor belts using the seam fabrication technique described above in Example 4. For the photoreceptor web sheet of Example 2, the upward curling of the photoreceptor web was removed by performing the above-described charge transport layer stress release treatment process prior to the ultrasonic seam welding operation.

When each was cycled in a belt support module, employing an active steering/tension roller for belt walk control, the photoreceptor belt formed from the photoreceptor web of Example 1 exhibited the onset of ripple formations after only about 160 cycles. In contrast, the photoreceptor belt formed from exemplary embodiments of the photoreceptor web of this invention, free of an anti-curl backing layer, remained free from ripple defect development for up to about 28,000 cycles of testing.

EXAMPLE 6

A photoreceptor web was prepared according to the same procedures and using the same materials as described above in Example 1, except that the charge generating layer was substituted by a 1 μm thick charge generating layer containing hydroxy gallium phthalocyanine in polystyrene-polyvinylpyridine block copolymer binder, and the charge transport layer was replaced by a hole transporting active polymer of poly(ether carbonate). This poly(ether carbonate) was a polymer of N,N'-diphenyl-N,N'-bis[3-hydroxyphenyl]-[1,1'biphenyl]-4,4' diamine and diethylene glycol bischloroformate described in U.S. Pat. No. 4,806,443, incorporated herein by reference in its entirety.

EXAMPLE 7

A photoreceptor web was prepared in the same manner as described above in Example 6, with the exception that the anti-curl backing layer was omitted. A rectangular photoreceptor web sheet of 2 inch width and 12 inch length was cut from the photoreceptor web and rolled up into a 0.75 inch tube. The tube was then subjected to the above-described charge transport layer stress release treatment process of this invention, by following the procedures described in Example 3, to eliminate the upward curling effect of the photoreceptor web.

EXAMPLE 8

A photoreceptor web was prepared according to the procedures and using the same materials as described above in Example 6, except that the charge transport layer comprised polysebacoyl, a hole transporting polymeric material of N,N'-diphenyl-N,N'-bis[3-hydroxyphenyl]-[1-1' biphenyl]-4,4' diamine and sebacoyl chloride described in U.S. Pat. No, 5,262,512, incorporated herein by reference in its entirety.

EXAMPLE 9

A photoreceptor web was prepared in the same manner and using the same materials as described above in Example 8, except that no anti-curl backing layer was applied. A rectangular photoreceptor web sheet having 2 inch width and a 12 inch length was cut from the photoreceptor web and rolled up into a 0.75 inch tube. The tube was then subjected to an exemplary embodiment of the charge transport layer stress release treatment process of this invention, using the procedures described above in Example 3, to remove the upward curling effect in the imaging sample.

EXAMPLE 10

A rectangular photoreceptor web sheet having a width of 2 inch and a 12 inch length was cut from each photoreceptor web of Examples 6 and 8. These sample strips, along with the sample sheets of Examples 7 and 9, were each ultrasonically welded into four individual seamed photoreceptor belts according to the procedures described above in Example 4.

Each individual photoreceptor belt was mounted onto a two 1-inch bi-roller belt support module for a Norpar 15 (a high boiling hydrocarbon liquid, available from EXXON Chemicals, used as the liquid developer's carrier fluid) exposure and fatigue cycling test. The photoreceptor belts formed from the photoreceptor webs, having an anti-curl coating and without being subjected to the treatment process according to this invention) of Examples 6 and 8 were used to serve as controls for comparison. The exposure and fatigue testing results obtained showed that Norpar 15 exposure was detrimental to both control photoreceptor belts, as both poly(ether carbonate) and polysebacoyl charge transport layers developed instantaneous cracking upon exposure to Norpar 15 liquid at the first cyclic bent passing over each 2-inch diameter belt support roller.

In sharp contrast, the photoreceptor belts of Examples 7 and 9, which had been previously subjected to an exemplary embodiment of the charge transport layer stress release process of this invention, were absolutely free of charge transport layer cracking after 300,000 fatigue cycles and constant contact with the Norpar 15. Also, the size of seam splashes for the photoreceptor belts of Examples 7 and 9 were about 40% smaller than their respective seam counterparts of the photoreceptor belts of Examples 6 and 8.

These results demonstrated the effectiveness of the exemplary embodiments of the treatment process of this invention, including the fabrication of structurally simplified photoreceptor webs without the need of an anti-curl layer, for fatigue charge transport layer cracking and seam cracking/delamination life extensions and seam thickness/splash size reduction. The treatment processes according to this invention also yield the added benefits of eliminating the dynamic fatigue belt ripple problem as well as transforming each photoreceptor belt into a liquid developer compatible belt.

Although the above-described Examples focus on treatment processes carried out for photoreceptor webs without an anti-curl backing layer, the charge transport layer stress release process of this invention is equally effective to provide the benefits of eliminating known fatigue charge transport cracking and seam cracking/delamination as well as liquid developer incompatibility problems when employed for photoreceptor webs having an anti-curl backing layer. Because the treatment process of this invention releases the charge transport layer internal stress/strain, it is also found to effect photoreceptor coating layers adhesion bond strength as well.

While the invention has been described in conjunction with the specific embodiments described above, it is evident that many alternatives, modifications, variations are apparent to those skilled in the art. Various changes can be made without departing from the spirit and scope of the invention.

What is claimed is:

1. A method of treating an electrostatographic imaging member web, comprising:
   (a) providing an electrostatographic imaging member web including a support substrate and at least one imaging layer formed over the support substrate, the imaging layer comprising a polymeric material having a glass transition temperature;
   (b) moving a first portion of the electrostatographic imaging member web into contact with and parked over a surface to form the first portion into an arcuate shape, the imaging layer of the first portion being disposed outwardly from the support substrate relative to the surface;

(c) heating the imaging layer of the first portion of the electrostatographic imaging member web to a temperature above the glass transition temperature while the first portion is in the arcuate shape;

(d) cooling the first portion of the electrostatographic imaging member web to a temperature below the glass transition temperature of the imaging layer while the first portion is in the arcuate shape, so that the imaging layer of the cooled first portion is substantially stress free as conformed in the arcuate shape;

(e) subsequent to (d), moving the electrostatographic imaging member web relative to the surface so that the cooled first portion is not in contact with the surface and a second portion of the electrostatographic imaging member web is in contact with and parked over the surface to form the second portion into the arcuate shape; and (f) repeating (c) and (d) for the second portion of the electrostatographic imaging member web so that the imaging layer of the second portion is substantially stress free;

wherein the second portion of the electrostatographic imaging member web is at a temperature below the glass transition temperature of the imaging layer while the first portion is in the arcuate shape and being heated; and wherein the first portion of the electrostatographic imaging member web is at a temperature below the glass transition temperature of the imaging layer while the second portion is in the arcuate shape and being heated.

2. The method of claim 1, wherein the electrostatographic imaging member web does not include an anti-curl backing layer.

3. The method of claim 1, wherein the electstatographic imaging member web is an electrophotographic imaging member web and the imaging layer comprises at least a charge transport layer.

4. The method of claim 1, wherein the electrostatographic imaging member web is an electrographic imaging member web and the imaging member web comprises an imaging layer.

5. The method of claim 1, wherein the surface has a circular cross-sectional shape.

6. The method of claim 1, wherein the first portion and second portion of the electrostatographic imaging member web are heated to the temperature above the glass transition temperature of the imaging layer and are cooled to the temperature below the glass transition temperature of the imaging layer by respectively heating and cooling the surface.

7. The method of claim 6, wherein the surface is an outer surface of a hollow roller, the hollow roller including an annular shell and an inner chamber, the surface is heated and cooled by introducing a heated fluid and a cooled fluid, respectively, into the inner chamber.

8. The method of claim 1, wherein the surface has a circular cross-sectional shape and a diameter of from about 0.5 in to about 1.5 in, the electrostatographic imaging member web has a thickness of from about 0.08 mm to about 0.2 mm, and the fst portion of the electrostatographic imaging member web makes parking contact with the surface over an angular range of between about 90° C. and less than about 360° C.

9. A electrostatographic imaging member web treated according to the method of claim 1.

10. A method of making a seamed electrostatographic imaging member, comprising:

providing an electrostatographic imaging member web treated by the method of claim 1, the electrostatographic imaging member web is formed into individual imaging member web sheets each including a first end and an opposed second end;

overlapping the first and second ends of the electrostatographic imaging member web; and joining the first and second ends of the electrostatographic imaging member web sheet to form a seamed electrostatographic imaging member belt.

11. The method of claim 10, wherein the electrostatographic imaging member web comprises a photoreceptor web and the imaging layer comprises a charge transport layer.

12. A method of treating a photoreceptor web, comprising:

(a) providing a photoreceptor web including a support substrate and a charge transport layer formed over the substrate, the charge transport layer comprising a polymeric material having a glass transition temperature;

(b) moving a first portion of the photoreceptor web into contact with and parked over a surface having a cross-sectional shape to form the first portion into an arcuate shape, the charge transport layer of the first portion disposed outwardly from the support substrate relative to the surface;

(c) heating the charge transport layer of the first portion of the photoreceptor web to a temperature above the glass transition temperature while the first portion is in the arcuate shape;

(d) cooling the first portion of the photoreceptor web to a temperature below the glass transition temperature of the charge transport layer while the first portion is in the arcuate shape, so that the charge transport layer of the cooled first portion is substantially stress free as conformed in the arcuate shape;

(e) subsequent to (d), moving the photoreceptor web relative to the surface so that the cooled first portion is not in contact with the surface and a second portion of the photoreceptor web is in contact with and parked over the surface to form the second portion into the arcuate shape; and (f) repeating (c) and (d) for the second portion of the photoreceptor web so that the charge transport layer of the second portion is substantially stress free;

wherein the second portion of the photoreceptor web is at a temperature below the glass transition temperature of the charge transport layer while the first portion is in the arcuate shape and being heated; and wherein the first portion of the photoreceptor web is at a temperature below the glass transition temperature of the charge transport layer while the second portion is in the arcuate shape and being heated.

13. The method of claim 12, wherein the photoreceptor web does not include an anti-curl backing layer.

14. The method of claim 12, wherein the first portion and the second portion of the photoreceptor web are heated to the temperature above the glass transition temperature of the charge transport layer and are cooled to the temperature below the glass transition temperature of the charge transport layer by respectively heating and cooling the surface.

15. The method of claim 14, wherein the surface is an outer surface of a hollow roller, the hollow roller including an annular shell and an inner chamber, the surface is heated and cooled by introducing a heated fluid and a cooled fluid, respectively, into the inner chamber.

16. The method of claim 12, wherein the surface has a circular cross-sectional shape and a diameter of from about 0.5 in to about 1.5 in, the photoreceptor web has a thickness of from about 0.08 mm to about 0.2 mm, and the first portion of the photoreceptor web makes parking contact with the surface over an angular range of between about 90° and less than about 360°.

17. A photoreceptor web treated according to the method of claim 12.

18. A method of making a seamed photoreceptor, comprising:

providing a photoreceptor web treated by the method of claim 13;

forming the photoreceptor web into individual photoreceptor sheets each including a first end and an opposed second end;

overlapping the first and second ends of one of the photoreceptor web sheets; and joining the first and second ends to form a seamed photoreceptor belt.

19. A photoreceptor belt formed from a web that has been subjected to a heating and cooling stress relief treatment, the photoreceptor belt comprising:

a support substrate; and a charge transport layer formed over the support substrate;

wherein the entire charge transport layer is substantially stress free when the photoreceptor belt is placed in contact with an arcuate surface and conformed to the shape of the arcuate surface, and wherein the photoreceptor belt and the arcuate surface have the same diameter of from 0.5 in to 1.5 in.

20. The method of claim 1, further comprising subsequent to (f), repeating (e) and (f) for additional portions of the electrostatographic imaging member web so that the entire electrostatographic imaging member web is treated and the entire imaging layer is substantially stress free.

21. The method of claim 12, further comprising subsequent to (f), repeating (e) and (f) for additional portions of the photoreceptor web so that the entire photoreceptor web is treated and the entire imaging layer is substantially stress free.

22. The method of claim 1, wherein the first portion and the second portion have the same curvature when in contact with the surface.

23. The method of claim 12, wherein the first portion and the second portion have the same curvature when in contact with the surface.

24. A method of treating a photoreceptor web, comprising:

(a) providing a photoreceptor web including a support substrate and a charge transport layer formed over the substrate, the charge transport layer comprising a polymeric material having a glass transition temperature;

(b) moving a first portion of the photoreceptor web into contact with and parked over a surface having a cross-sectional shape to form the first portion into an arcuate shape, the charge transport layer of the first portion disposed outwardly from the support substrate relative to the surface;

(c) heating the charge transport layer of the first portion of the photoreceptor web to a temperature above the glass transition temperature while the first portion is in the arcuate shape, the remainder of the photoreceptor web other than the first portion being at a temperature below the glass transition temperature of the charge transport layer while the first portion is in the arcuate shape and being heated and cooled;

(d) cooling the first portion of the photoreceptor web to a temperature below the glass transition temperature of the charge transport layer while the first portion is in the arcuate shape, so that the charge transport layer of the cooled first portion is substantially stress free as conformed in the arcuate shape;

(e) subsequent to (d), moving the photoreceptor web relative to the surface so that the cooled first portion is not in contact with the surface and a second portion of the photoreceptor web is in contact with and parked over the surface to form the second portion into the arcuate shape; and (f) repeating (c) and (d) so that the charge transport layer of the second portion is substantially stress free, the remainder of the photoreceptor web other than the second portion being at a temperature below the glass transition temperature of the charge transport layer while the second portion is in the arcuate shape and being heated and cooled.

25. The method of claim 24, further comprising subsequent to (f), repeating (e) and (f) for additional portions of the photoreceptor web so that the entire photoreceptor web is treated and the entire charge transport layer is substantially stress free.

26. The method of claim 24, wherein the photoreceptor web does not include an anti-curl backing layer.

27. The method of claim 24, wherein the photoreceptor web is heated to the temperature above the glass transition temperature of the charge transport layer and is cooled to the temperature below the glass transition temperature of the charge transport layer by respectively heating and cooling the surface.

28. The method of claim 24, wherein the surface has a circular cross-sectional shape and a diameter of from about 0.5 in to about 1.5 in, the photoreceptor web has a thickness of from about 0.08 mm to about 0.2 mm, and the photoreceptor web makes parking contact with the surface over an angular range of between about 90° and less than about 360°.

29. The method of claim 24, wherein the first portion and the second portion have the same curvature when in contact with the surface.

* * * * *